US010650230B2

(12) United States Patent
Johnson

(10) Patent No.: US 10,650,230 B2
(45) Date of Patent: May 12, 2020

(54) IMAGE DATA EXTRACTION USING NEURAL NETWORKS

(71) Applicant: SAP SE, Walldorf OT (DE)

(72) Inventor: Reid Johnson, Bellevue, WA (US)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 16/007,877

(22) Filed: Jun. 13, 2018

(65) Prior Publication Data

US 2019/0384970 A1  Dec. 19, 2019

(51) Int. Cl.
*G06K 9/00* (2006.01)
*G06K 9/52* (2006.01)
*G06N 3/08* (2006.01)
*G06K 9/62* (2006.01)

(52) U.S. Cl.
CPC ........... *G06K 9/00442* (2013.01); *G06K 9/52* (2013.01); *G06K 9/62* (2013.01); *G06N 3/08* (2013.01); *G06K 2209/01* (2013.01)

(58) Field of Classification Search
CPC ..... G06N 3/0454; G06N 3/0445; G06N 3/084
See application file for complete search history.

(56) References Cited

U.S. PATENT DOCUMENTS

| | | | | |
|---|---|---|---|---|
| 10,417,788 B2* | 9/2019 | Risman | | G06N 3/08 |
| 2019/0130213 A1* | 5/2019 | Shazeer | | G06T 3/4053 |
| 2019/0130578 A1* | 5/2019 | Gulsun | | G06N 3/0454 |
| 2019/0279035 A1* | 9/2019 | Bluche | | G06K 9/6256 |
| 2019/0385001 A1* | 12/2019 | Stark | | G06N 3/0472 |

OTHER PUBLICATIONS

Dzmitry Bahdanau et al, "Neural Machine Translation by Jointly Learning to Align and Translate," in ICLR 2015, May 19, 2016, 12 pages.
Ilya Sutskever et al, "Sequence to Sequence Learning with Neural Networks," Dec. 14, 2014, 9 pages.
Jiang Wang et al, "CNN-RNN: A Unified Framework for Multi-label Image Classification," Cornell University Library, Apr. 15, 2016, 10 pages.
Yuntian Deng et , "Image-to-Markup Generation with Coarse-to-Fine Attention," Proceedings of the 34th International Conference on Machine Learning, Jun. 13, 2017, Sydney, Australia, 10 pages.

(Continued)

*Primary Examiner* — Ross Varndell
(74) *Attorney, Agent, or Firm* — Fountainhead Law Group P.C.

(57) ABSTRACT

Embodiments of the present disclosure pertain to extracting data from images using neural networks. In one embodiment, an image is fit to a predetermined bounding window. The image is then processed with a convolutional neural network to produce a three dimensional data cube. Slices of the cube are processed by an encoder RNN, and the results concatenated. The concatenated results are processed by an attention layer with input from a downstream decoder RNN. The attention layer output is provided to the decoder RNN to generate a probability array where values in the probability array correspond to particular characters in a character set. The maximum value is selected, and translated into an output character. In one embodiment, an amount may be extracted from an image of a receipt.

20 Claims, 5 Drawing Sheets

(56) References Cited

OTHER PUBLICATIONS

Andrej Karpathy et al.,Deep Visual-Semantic Alignments for Generating Image Descriptions,CVPR 2015 Conference, Jun. 8-12, 2015, 17 pages.
Yann Lecun et al., "Convolutional Networks for Images, Speech, and Time-Series," Handbook of Brain Theory and Neural Networks. MIT Press, published Jun. 1995, 14 pages.

* cited by examiner

IMAGE DATA EXTRACTION USING NEURAL NETWORKS

BACKGROUND

The present disclosure relates to data extraction, and in particular, to extracting data from an image using neural networks.

The proliferation of cameras and other electronic image capture devices has led to massive growth in the availability of images. For example, cameras can be found on almost all mobile devices, and such ready access to a camera allows users to capture an ever increasing amount of electronic images. Interestingly, images often contain data, and such data can be useful for a wide range of applications. However, extracting data from an image is no simple task. For example, an image of a receipt may include data about the particular expenses. However, accurately extracting such data from the image is challenging. Accordingly, it would be advantageous to discover efficient and effective techniques for extracting data from electronic images.

SUMMARY

Embodiments of the present disclosure pertain to extracting data from images using neural networks. In one embodiment, an image is fit to a predetermined bounding window. The image is then processed with a convolutional neural network to produce a three dimensional data cube. Slices of the cube are processed by an encoder RNN, and the results concatenated. The concatenated results are processed by an attention layer with input from a downstream decoder RNN. The attention layer output is provided to the decoder RNN to generate a probability array where values in the probability array correspond to particular characters in a character set. The maximum value is selected, and translated into an output character. In one embodiment, an amount may be extracted from an image of a receipt.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
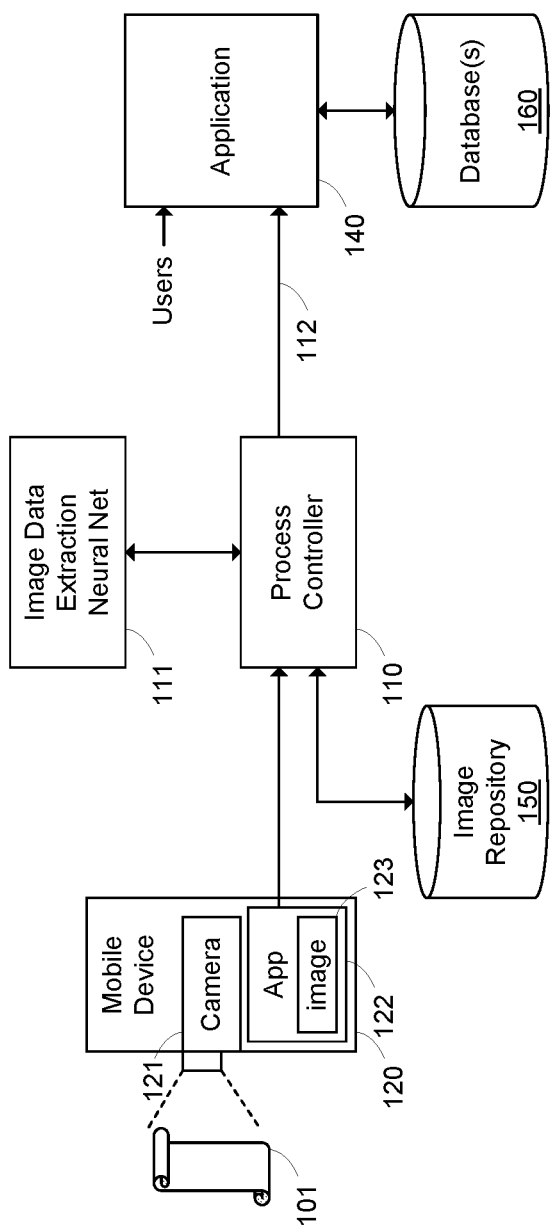
FIG. 1 illustrates an architecture for extracting data from an image according to one embodiment.

FIG. 1 illustrates an architecture for extracting data from an image according to one embodiment. As used herein, an "image" refers to an electronic image, which may include electronic photographs or pictures stored in one of a variety of digital formats, for example. As illustrated in FIG. 1, a mobile device 120 may include a camera 121. Camera 121 may be used to take a picture and create an image 123, which may be stored on mobile device 120. The following description uses an example image of a receipt 101 captured on a mobile device 120 to describe various aspects of the disclosure. However, it is to be understood that this is not the only embodiment that may use the features and techniques described herein. In this example, mobile device 120 includes an application 122 (aka "App"), which, when accessed, automatically accesses the camera. In one embodiment, the App may be an "Expense App" that includes functionality for accessing the camera to take a picture of a receipt and sending the image to a backend system, for example.

In this example, the image 123 is sent to a backend software system that includes functionality for extracting data from the image. The backend software system may include a process controller component 110, image data extraction neural network component 111, image repository 150, an application 140, and one or more databases 160. In this example, process controller 110 may receive images from App 123, via email, or through a variety of other image transfer mechanisms (e.g., text, links, etc. . . . ). Process controller 110 may control storing images in repository 150, sending images to image data extraction neural network component 111, and forward extracted data to application 140 and database 160, which process and store the data, respectively, so users can interact with the data through application 140, for example. In one embodiment, the image is a receipt, and the application is an Expense Application, for example. Process controller 110 may send an image to image data extraction neural network component 111, and the image data extraction neural network component 111 may return data from the image (e.g., an amount from a receipt), for example. Advantages of the present disclosure include the elimination of optical character recognition (OCR) software. Instead, one or more particular data elements (e.g., an amount) are extracted directly from the image using a neural network without the intermediate step of extracting characters and then determining the desired data to extract from a character set.

Figure 2:
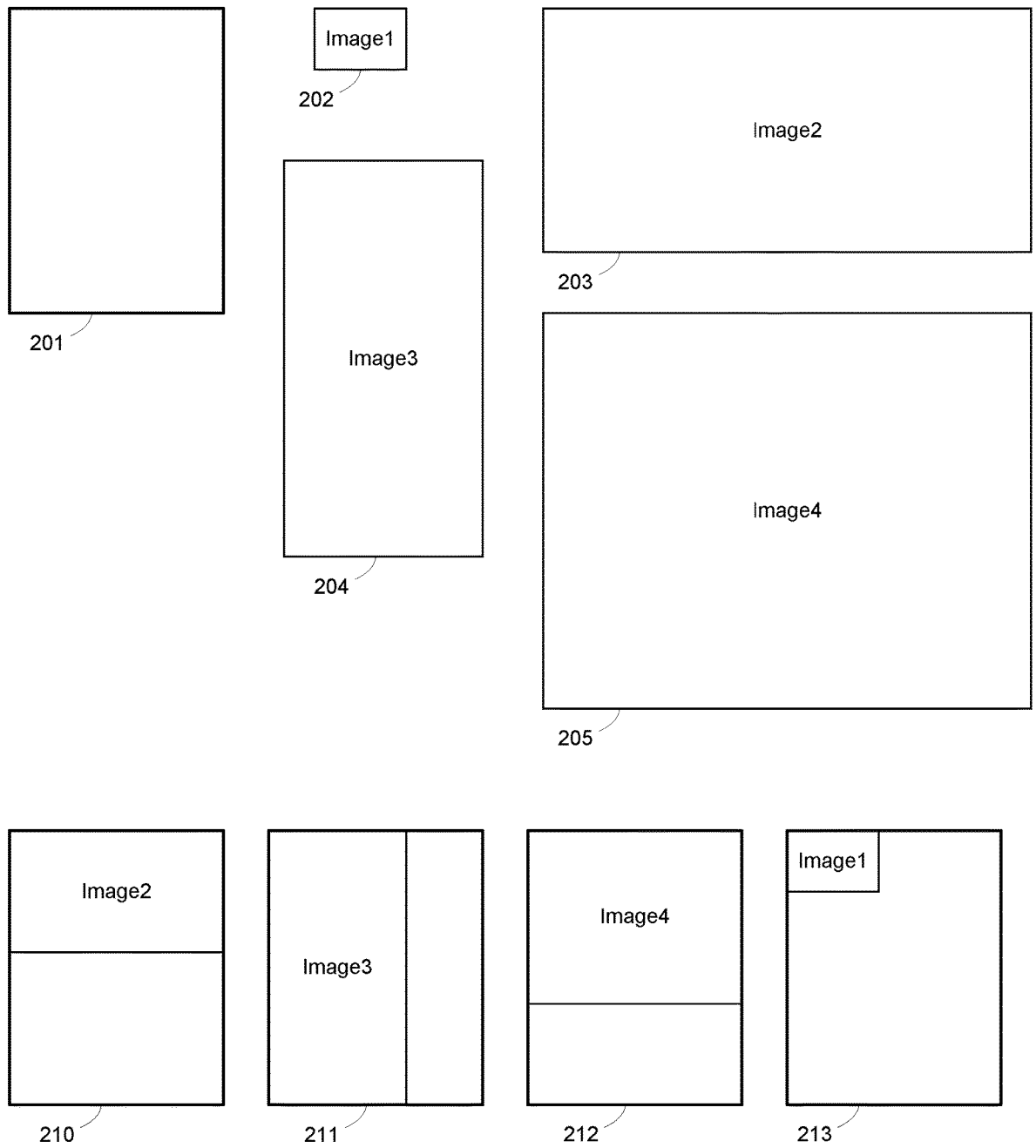
FIG. 2 illustrates fitting an image to a predefined bounding window according to an embodiment.

FIG. 2 illustrates fitting an image to a predefined bounding window according to an embodiment. In some embodiments, an image may be fit to a predefined bounding window to improve data recognition and extraction accuracy. A predefined bounding window is shown at 201 in FIG. 2. A predefined bounding window may have a set pixel size, and images may be positioned inside the window so the neural network has a predefined pixel height and width as an input. For example, window 201 may be set to approximately the aspect ratio of a standard 8½×11 or A4 paper with a pixel height of 512 and a pixel width of 396. First, the system may determine if the image has a height or width, in pixels, greater than a height or width of a predefined bounding window. For example, a variety of sizes of images may be processed by the system. FIG. 2 illustrates an image 202 having a pixel height and width that are both less than the pixel height and width of window 201, a second image 203 having a pixel height that is less than the pixel height of window 201 but a pixel width that is greater than the pixel width of window 201, a third image 204 having a pixel width that is less than the pixel width of window 201 but a pixel height that is greater than the pixel height of window 201, and a fourth image having a pixel height and width that are both greater than the pixel height and width of window 201. Features and advantages of the present disclosure include scaling down the size of the image when one of the pixel height or width of the image is greater than a corresponding one of the pixel height or width of the predefined bounding window. Accordingly, one of the pixel height or width of the image is scaled down to be approximately equal to the corresponding pixel height or width of the predefined bounding window. Scaling down an image may maintain the aspect ratio of the image while reducing the height and width, for example.

For example, image 203 may be scaled down so that the width of image 203 is approximately equal to the width of window 201 as illustrated at 210. Similarly, image 204 may be scaled down so that the height of image 204 is approximately equal to the height of window 201 as illustrated at 211. Likewise, image 205 may be scaled down so that one of the height or width of image 204 is approximately equal to one of the height or width of window 201 as illustrated at 212, where the width of the image meets the width of window 201 for the entire image to fit inside window 201, for example. In one embodiment, scaling down the size of the image comprises downscaling the image so that a proportion of pixels of each color in the original image and the scaled down image are approximately the same. Maintaining color proportionality may advantageously improve recognition and extraction of data from the image, for example.

In this example, when both the height and width of the image are less than the height and width of the predefined bounding window, the system does not scale the image. For example, image 202 has a pixel height and width that are both less than the pixel height and width of window 201. Thus, the image is not scaled. In particular, the image is not scaled up as illustrated at 213. Rather, for image 202 and images 203-205, the empty space in window 201 (i.e., space in the window not occupied by the image), illustrated in 210-215, is set to a predefined value. In these examples, the system positions the scaled down image (and the non-scaled down image) in a corner of the predefined bounding window (e.g., the upper left corner) and sets all values outside the image and inside the predefined bounding window to a predefined value (e.g., 0). In some embodiments, the image may further be converted to grayscale prior to being received by the convolutional neural network, as will now be described.

Figure 3:
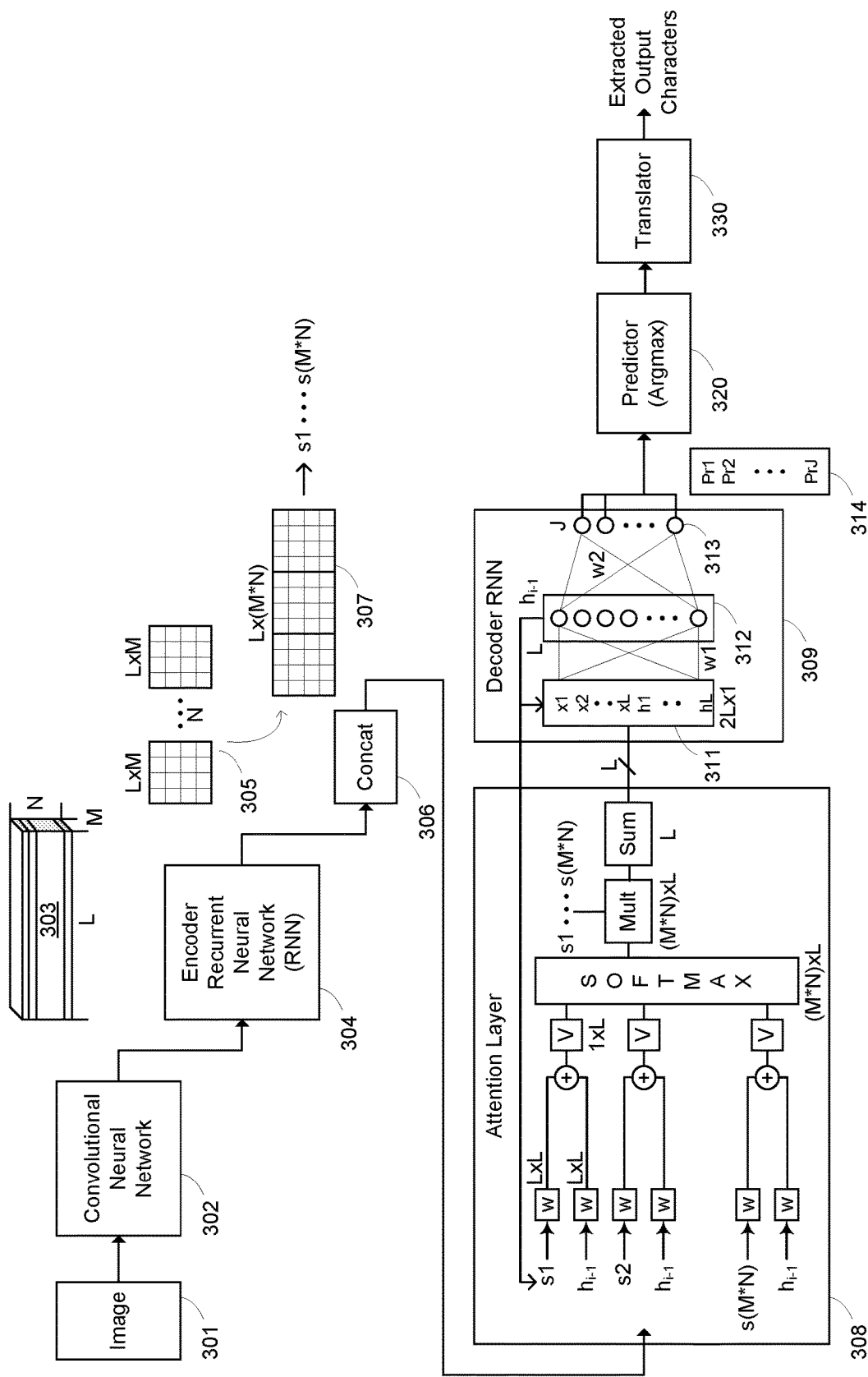
FIG. 3 illustrates a neural network recognition process according to an embodiment.

FIG. 3 illustrates a neural network recognition process according to an embodiment. Features and advantages of the present disclosure include direct image to data extraction without the requirement of OCR, for example. As illustrated in FIG. 3, an image 301 may be received in a convolutional neural network 302. Image 301 may have been fit into a boundary window as described above, for example, to improve data extraction accuracy.

In machine learning, a convolutional neural network (CNN, or ConvNet) is a class of deep, feed-forward artificial neural networks. A CNN architecture is formed by a stack of distinct layers that transform the input volume into an output volume. A convolutional layer is the core building block of a CNN. The layer's parameters consist of a set of learnable filters, which have a small receptive field, but extend through the full depth of the input volume. During a forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Convolutional networks may include local or global pooling layers, which combine the outputs of neuron clusters at one layer into a single neuron in the next layer. For example, max pooling uses the maximum value from each of a cluster of neurons at the prior layer. Another example is average pooling, which uses the average value from each of a cluster of neurons at the prior layer.

In one example embodiment, a CNN architecture is implemented such that one or more convolutional layers are interleaved with pooling layers that may pool values by width, by height, or by width and height, producing an output that preserves some of the width and height of the original input volume. The number of pooling layers is limited to ensure that the width and height of the output layer is less than the original input but greater than one in both dimensions.

Embodiments of the present disclosure may receive an image in a convolutional neural network 320, and in accordance therewith, produce an L×M×N three (3) dimensional array of data values (or, a data cube) 303, where L, M, and N are integers. M may be referred to as the width of the data cube, N may be referred to as the height of the data cube, and L may be referred to as the depth of the data cube, for example. For illustrative and clarity purposes, the following disclosure uses the values of L=512; M=99, N=16. However, it is to be understood that other values for L, M, and N may be used in other implementations.

Features and advantages of the present disclosure include translating a three (3) dimensional (3D) data structure into a two (2) dimensional (2D) data structure for extracting specific data from an input image, for example. For instance, in this example each L×M slice of cube 303 corresponds to M characters encoded by a L-length vector. Accordingly, each of the N L×M slices of the three dimensional array of data values 303 may be sequentially processed in an encoder recurrent neural network (RNN) 304 to produce N L×M outputs 305 (e.g., 16 512×99 arrays of values, or one for each of the 16 slices). In one embodiment, the encoder RNN 304 is a bidirectional encoder RNN, where each slice of L×M is divided into M input vectors of length L×1. Input vectors are processed in parallel from M=1 to M and M=M to 1 (i.e., the $1^{st}$ 512×1 vector is processed in parallel with the $99^{th}$ 512×1 vector, the $2^{nd}$ 512×1 is processed in parallel with the $98^{th}$ 512×1, and so on in reverse order). The N L×M outputs 305 may be concatenated at 306 to produce one L×(M*N) array of values 307 (e.g., an array of size 512×(99*16)=512×1584).

The concatenated outputs of the encoder RNN 304 may be input to an attention layer 308. For example, attention layer 308 may receive (M*N) inputs of length L, where the concatenated outputs of the RNN 304 are fed into the attention layer as individual vectors (e.g., 1584 vectors of length 512×1), for example. Attention layer 308 may normalize the values across all the input vectors. For example, attention layer 308 may normalize the M times N (e.g., M*N=1584) values in each row to produce an L×1 (e.g., 512×1) attention vector. For example, normalization may include processing the L×(M*N) array as M*N L×1 arrays (e.g., arrays S1–S(M*N) in FIG. 3) in an attention array 308. For each L×1 array, Si, the attention array may multiply each row of the L×1 array by first learned weights (e.g, S1*w) to produce a first L×L output, and multiply a previous internal state, $h_{i-1}$, of the decoder recurrent neural network by second learned weights (e.g., $h_{i-1}*w$) to produce a second L×L output. The first and second L×L outputs may be added together, for example, and the added first and second L×L outputs may be multiplied by a third learned weights, V, to produce a L×1 result. As illustrated in FIG. 3, M*N arrays of size L×1 from the concatenated output of RNN 304 are processed in this manner. The M*N L×1 results are concatenated and then have a softmax function applied to them to produce a normalization array. The normalization array may be multiplied by the M*N L×1 arrays from the output of RNN 304 and the result is summed over M*N to produce an L×1 attention vector, for example. The softmax function, or normalized exponential function, is a generalization of the logistic function that "squashes" a K-dimensional vector z of arbitrary real values to a K-dimensional vector σ(z) of real values, where each entry is in the range (0, 1), and all the entries adds up to 1.

Next, for a plurality of cycles corresponding to a maximum number of characters to be extracted from the image, a decoder RNN 309 generates probability vectors. The number of cycles used may correspond to a maximum number of characters to be extracted from the image (e.g., a maximum number of characters for an amount). First, the decoder RNN 309 may concatenate the L×1 attention vector (from the output of attention layer 308) with an L×1 internal state vector 312, $h_{i-1}$, of the decoder RNN to produce a (2*L)×1 input vector, as illustrated at 311. In one embodiment, the L×1 internal state vector has an initial value of zero ($h_0$=0). The (2*L)×1 input vector 311 may be combined with an L×L weight matrix, w1, to produce the L×1 internal state vector 312, for example. The L×1 internal state vector 312 may be matrix multiplied by an J×L weight matrix, w2, to produce a J×1 vector of probability values 314, where each probability value in the J×1 vector corresponds to a likelihood for one character to be extracted of a character set having J distinct characters, for example.

Probability vector 314 is input to predictor 320, which selects the probability value having the greatest value. In one embodiment, predictor 320 uses an Argmax function to extract the value from the input vector with the highest value.

The selected probability with the greatest value corresponds to a particular character. Next, the selected probability is translated into a representation of a character. For example, different characters in a character set may be represented by one or more values. In one embodiment, a predefined set of I characters (e.g., I=15, for 0-9, . , - , <start>, <end>, and <unknown>) are each represented by a vector of values of length K, where I and K are integers, for example.

On each cycle, translator 330 outputs another characters until all the extracted characters (e.g., corresponding to an amount of a receipt in the image) are produced over the all of cycles.

Figure 4:
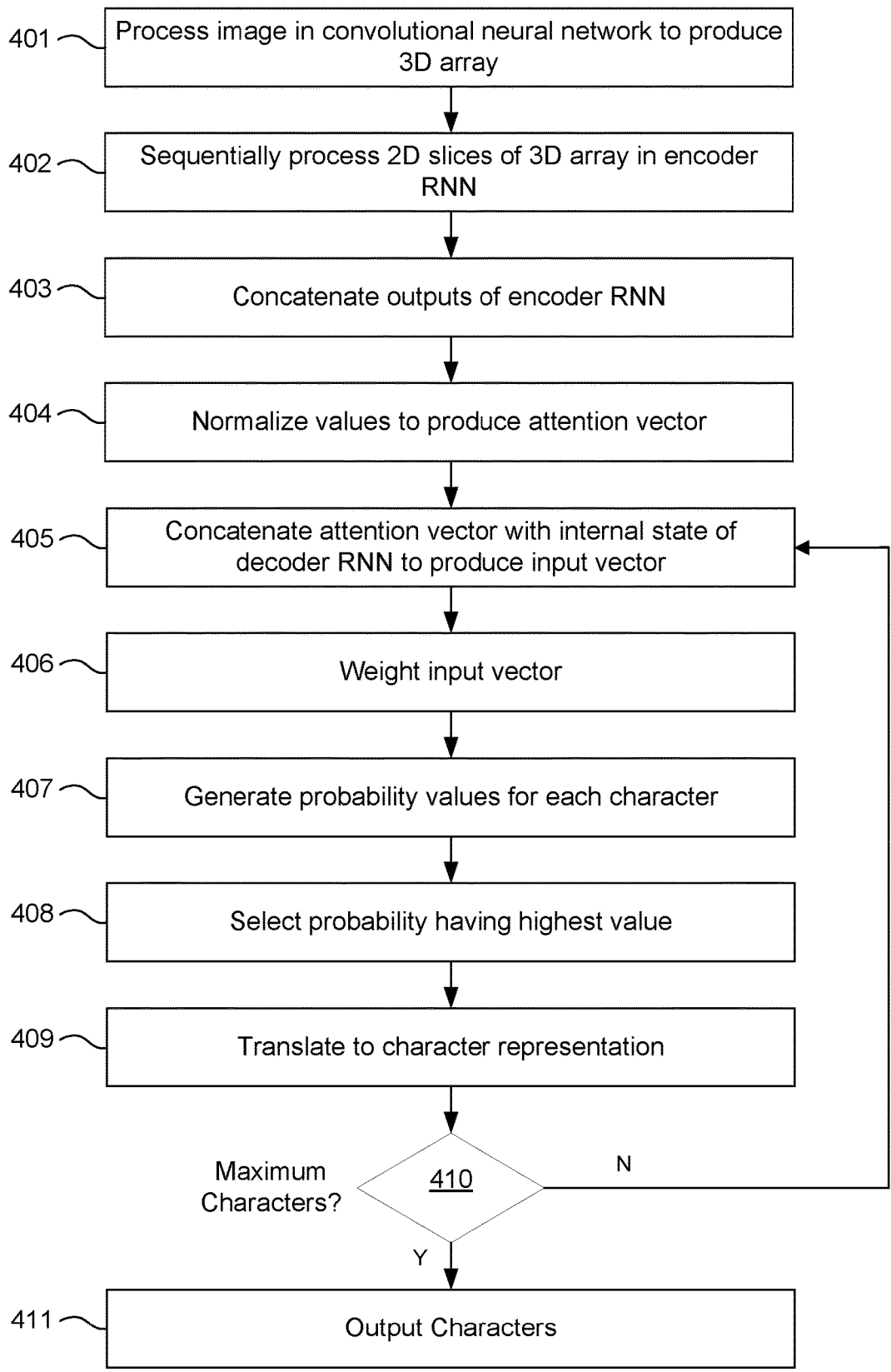
FIG. 4 illustrates a process of extracting data from an image using a neural network according to an embodiment.

FIG. 4 illustrates a process of extracting data from an image using a neural network according to an embodiment. At 401, an image is processed in a convolutional neural network, and in accordance therewith, a L×M×N three (3) dimensional array of data values is produced, wherein L, M, and N are integers. At 402, each L×M 2D slice of the three-dimensional array of data values is sequentially processing in an encoder RNN to produce N L×M outputs. Each L×M slice may correspond to M characters encoded by a L-length vector, for example. At 403, the N L×M outputs are concatenated to produce an L×(M*N) array of values. At 404, the M times N ("M*N") values in each row are normalized to produce an L×1 attention vector. Steps 405-409 may be repeated for a plurality of cycles corresponding to a maximum number of characters to be extracted from the image. For example, at 405, the L×1 attention vector may be concatenated with an L×1 internal state vector of a decoder RNN to produce a (2*L)×1 input vector to the decoder RNN. At 406, the (2*L)×1 input vector is combined with an L×L weight matrix to produce the L×1 internal state vector. At 407, the L×1 internal state vector multiplied by an J×L weight matrix to produce a J×1 vector of probability values, where each probability value in the J×1 vector corresponds to a likelihood for one character to be extracted of a character set having J distinct characters. At 408, the probability value having the greatest value is selecting. At 409, the selected probability is translated into a representation of a character. Once the maximum number of characters is reached, at 410, the characters produced over the plurality of cycles may be output by the system.

Figure 5:
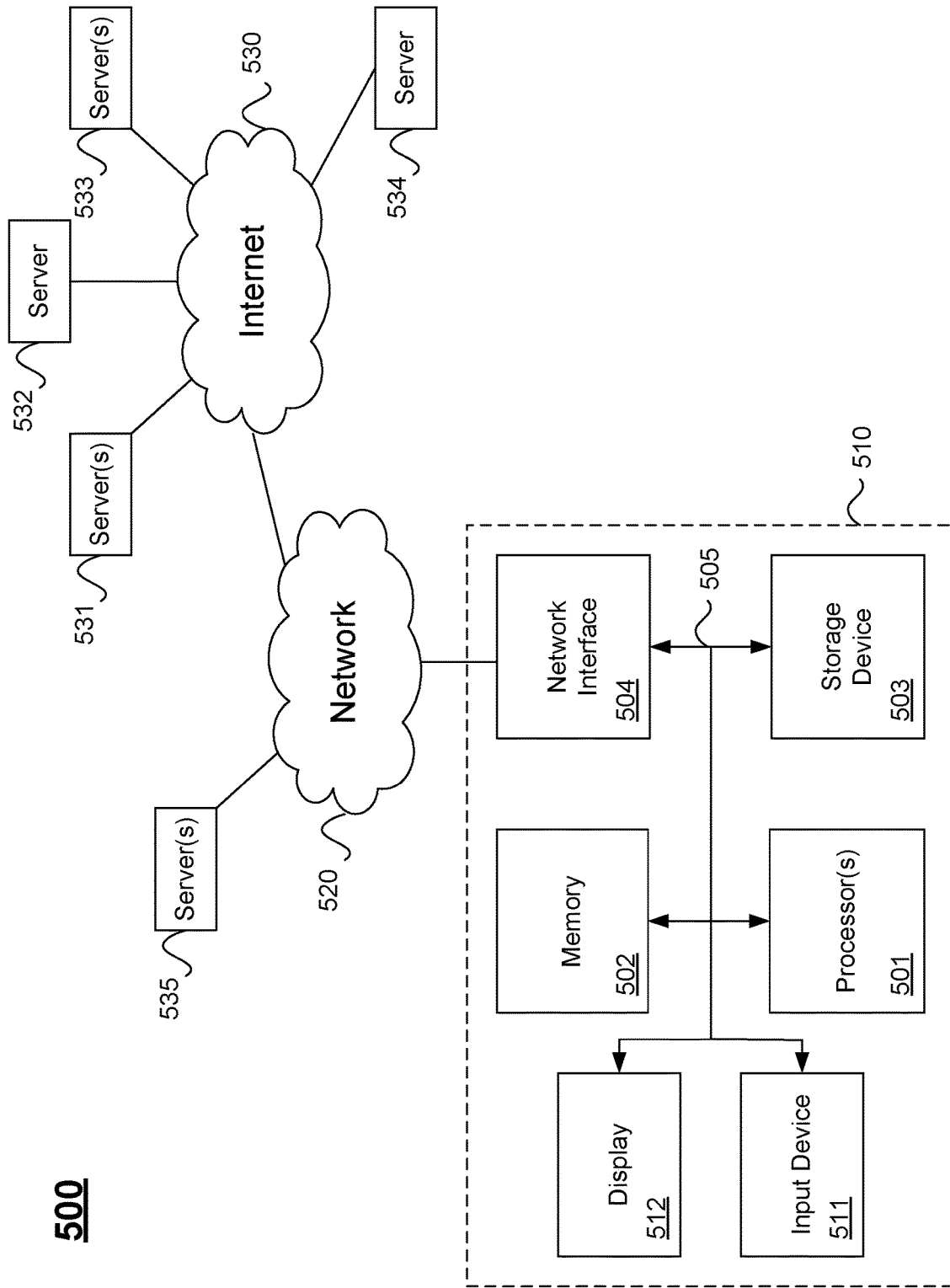
FIG. 5 illustrates computer system hardware configured according to the above disclosure.

FIG. 5 illustrates computer system hardware configured according to the above disclosure. The following hardware description is merely one illustrative example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device 503 and memory 502 are both examples of non-transitory computer readable storage mediums.

Computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a browser, for example, may access data and features on backend software systems that may reside on multiple different hardware servers on-prem 535 or across the Internet 530 on servers 531-534. One or more of servers 531-534 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
receiving an image in a convolutional neural network, and in accordance therewith, producing an L×M×N three (3) dimensional array of data values, wherein L, M, and N are integers;
sequentially processing each L×M slice of the three dimensional array of data values in an encoder recurrent neural network to produce N L×M outputs, wherein each L×M slice corresponds to M characters encoded by a L-length vector;
concatenating the N L×M outputs to produce an L×(M*N) array of values;
normalizing the M times N values in each row to produce an L×1 attention vector;
for a plurality of cycles corresponding to a maximum number of characters to be extracted from the image:
concatenating the L×1 attention vector with an L×1 internal state vector of a decoder recurrent neural network to produce a (2*L)×1 input vector to the decoder recurrent neural network;
combining the (2*L)×1 input vector with an L×L weight matrix to produce the L×1 internal state vector;
matrix multiplying the L×1 internal state vector by an J×L weight matrix to produce a J×1 vector of probability values, wherein each probability value in the J×1 vector corresponds to a likelihood for one character to be extracted of a character set having J distinct characters; and
selecting the probability value having the greatest value; and
translating the selected probability into a representation of a character;
outputting the characters produced over the plurality of cycles.

2. The method of claim 1 wherein the image is an image of a receipt and the characters produced over the plurality of cycles are an amount on the receipt.

3. The method of claim 1 wherein said normalizing comprises:
processing the L×(M*N) array as M*N L×1 arrays in an attention array, wherein, for each L×1 array:
multiplying in each row of the L×1 array by first weights to produce a first L×L output;
multiplying a previous internal state of the decoder recurrent neural network by second weights to produce a second L×L output;
adding the first and second L×L outputs; and
multiplying the added first and second L×L outputs by a third weights to produce a L×1 result;
concatenating the M*N L×1 results;
applying a softmax function to the M*N L×1 concatenated results to produce a normalization array;
multiplying the normalization array by the M*N L×1 arrays;
summing the output of said multiplying step to produce the L×1 attention vector.

4. The method of claim 1 wherein the L×1 internal state vector has an initial value of zero.

5. The method of claim 1 wherein a predefined set of I characters are each represented by a vector of values of length K, wherein I and K are integers.

6. The method of claim 1 wherein the convolutional neural network comprises one or more convolutional layers interleaved with pooling layers that may pool values by width, by height, or by width and height.

7. The method of claim 1 further comprising, prior to said receiving the image in a convolutional neural network:
determining if the image has a height or width, in pixels, greater than a height or width of a predefined bounding window;
when one of the height or width of the image is greater than a corresponding one of the height or width of the predefined bounding window, scaling down the size of the image so that said one of the height or width of the image is approximately equal to the corresponding height or width of the predefined bounding window; and
when both the height and width of the image are less than the height and width of the predefined bounding window, not scaling the image.

8. The method of claim 7 wherein said scaling down the size of the image comprises downscaling the image so that a proportion of pixels of each color in the image and the scaled down image are approximately the same.

9. The method of claim 7 further comprising positioning the scaled down image in a corner of the predefined bounding window and setting all values outside the image and inside the predefined bounding window to a predefined value.

10. The method of claim 1 wherein image is converted to grayscale prior to being received by the convolutional neural network.

11. The method of claim 1 wherein the encoder recurrent neural network is a bidirectional encoder neural network.

12. A non-transitory machine-readable medium storing a program executable by at least one processing unit of a computer, the program comprising sets of instructions for:
receiving an image in a convolutional neural network, and in accordance therewith, producing an L×M×N three (3) dimensional array of data values, wherein L, M, and N are integers;
sequentially processing each L×M slice of the three-dimensional array of data values in an encoder recurrent neural network to produce N L×M outputs, wherein each L×M slice corresponds to M characters encoded by a L-length vector;
concatenating the N L×M outputs to produce an L×(M*N) array of values;
normalizing the M times N values in each row to produce an L×1 attention vector;
for a plurality of cycles corresponding to a maximum number of characters to be extracted from the image:
concatenating the L×1 attention vector with an L×1 internal state vector of a decoder recurrent neural network to produce a (2*L)×1 input vector to the decoder recurrent neural network;

combining the (2*L)×1 input vector with an L×L weight matrix to produce the L×1 internal state vector;

matrix multiplying the L×1 internal state vector by an J×L weight matrix to produce a J×1 vector of probability values, wherein each probability value in the J×1 vector corresponds to a likelihood for one character to be extracted of a character set having J distinct characters; and selecting the probability value having the greatest value; and translating the selected probability into a representation of a character;

outputting the characters produced over the plurality of cycles.

13. The non-transitory machine-readable medium of claim 12 wherein the image is an image of a receipt and the characters produced over the plurality of cycles are an amount on the receipt.

14. The non-transitory machine-readable medium of claim 12 wherein said normalizing comprises:

processing the L×(M*N) array as M*N L×1 arrays in an attention array, wherein, for each L×1 array:
multiplying in each row of the L×1 array by first weights to produce a first L×L output;
multiplying a previous internal state of the decoder recurrent neural network by second weights to produce a second L×L output;
adding the first and second L×L outputs; and
multiplying the added first and second L×L outputs by third weights to produce a L×1 result;
concatenating the M*N L×1 results;
applying a softmax function to the M*N L×1 concatenated results to produce a normalization array;
multiplying the normalization array by the M*N L×1 arrays;
summing the output of said multiplying step to produce the L×1 attention vector.

15. The non-transitory machine-readable medium of claim 12 wherein the convolutional neural network comprises one or more convolutional layers interleaved with pooling layers that may pool values by width, by height, or by width and height.

16. The non-transitory machine-readable medium of claim 12 further comprising, prior to said receiving the image in a convolutional neural network:

determining if the image has a height or width, in pixels, greater than a height or width of a predefined bounding window;

when one of the height or width of the image is greater than a corresponding one of the height or width of the predefined bounding window, scaling down the size of the image so that said one of the height or width of the image is approximately equal to the corresponding height or width of the predefined bounding window; and when both the height and width of the image are less than the height and width of the predefined bounding window, not scaling the image.

17. A computer system comprising:
a processor; and
a non-transitory machine-readable medium storing a program executable by the processor, the program comprising sets of instructions for:

receiving an image in a convolutional neural network, and in accordance therewith, producing an L×M×N three (3) dimensional array of data values, wherein L, M, and N are integers;

sequentially processing each L×M slice of the three-dimensional array of data values in an encoder recurrent neural network to produce N L×M outputs, wherein each L×M slice corresponds to M characters encoded by a L-length vector;

concatenating the N L×M outputs to produce an L×(M*N) array of values;

normalizing the M times N values in each row to produce an L×1 attention vector;

for a plurality of cycles corresponding to a maximum number of characters to be extracted from the image:
concatenating the L×1 attention vector with an L×1 internal state vector of a decoder recurrent neural network to produce a (2*L)×1 input vector to the decoder recurrent neural network;
combining the (2*L)×1 input vector with an L×L weight matrix to produce the L×1 internal state vector;
matrix multiplying the L×1 internal state vector by an J×L weight matrix to produce a J×1 vector of probability values, wherein each probability value in the J×1 vector corresponds to a likelihood for one character to be extracted of a character set having J distinct characters; and
selecting the probability value having the greatest value; and
translating the selected probability into a representation of a character;
outputting the characters produced over the plurality of cycles.

18. The computer system of claim 17 wherein the image is an image of a receipt and the characters produced over the plurality of cycles are an amount on the receipt.

19. The computer system of claim 17 wherein said normalizing comprises:

processing the L×(M*N) array as M*N L×1 arrays in an attention array, wherein, for each L×1 array:
multiplying in each row of the L×1 array by first weights to produce a first L×L output;
multiplying a previous internal state of the decoder recurrent neural network by second weights to produce a second L×L output;
adding the first and second L×L outputs; and
multiplying the added first and second L×L outputs by third weights to produce a L×1 result;
concatenating the M*N L×1 results;
applying a softmax function to the M*N L×1 concatenated results to produce a normalization array;
multiplying the normalization array by the M*N L×1 arrays;
summing the output of said multiplying step to produce the L×1 attention vector.

20. The computer system of claim 17 further comprising, prior to said receiving the image in a convolutional neural network:

determining if the image has a height or width, in pixels, greater than a height or width of a predefined bounding window;

when one of the height or width of the image is greater than a corresponding one of the height or width of the predefined bounding window, scaling down the size of the image so that said one of the height or width of the image is approximately equal to the corresponding height or width of the predefined bounding window; and when both the height and width of the image are less than the height and width of the predefined bounding window, not scaling the image.

* * * * *